(12) United States Patent
Matsumoto

(10) Patent No.: US 9,590,440 B2
(45) Date of Patent: Mar. 7, 2017

(54) MOBILE ELECTRONIC DEVICE AND CHARGE CONTROL METHOD

(71) Applicant: FUJITSU LIMITED, Kawasaki-shi, Kanagawa (JP)

(72) Inventor: Shuji Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 196 days.

(21) Appl. No.: 14/567,501

(22) Filed: Dec. 11, 2014

(65) Prior Publication Data

US 2015/0198637 A1 Jul. 16, 2015

(30) Foreign Application Priority Data

Jan. 16, 2014 (JP) .................................. 2014-006132

(51) Int. Cl.
*G01R 21/00* (2006.01)
*H02J 7/00* (2006.01)

(52) U.S. Cl.
CPC ............ *H02J 7/007* (2013.01); *H02J 7/0029* (2013.01); *H02J 7/0052* (2013.01); *H02J 7/0093* (2013.01); *H02J 2007/0039* (2013.01); *H02J 2007/0062* (2013.01)

(58) Field of Classification Search
CPC ... H02J 7/0052; H02J 7/007; H02J 2007/0062
USPC ....................................................... 320/114
See application file for complete search history.

(56) References Cited

U.S. PATENT DOCUMENTS

| | | | | | |
|---|---|---|---|---|---|
| 4,792,743 | A | * | 12/1988 | Tsujino et al. ........ | H02J 7/0031 320/124 |
| 5,349,282 | A | * | 9/1994 | McClure ............... | H02J 7/0081 320/136 |
| 5,793,186 | A | * | 8/1998 | Watabe et al. ........ | H02J 7/0036 320/112 |
| 6,020,721 | A | * | 2/2000 | Brotto .................. | H02J 7/0091 320/150 |

(Continued)

FOREIGN PATENT DOCUMENTS

CN 202008524 U 10/2011
JP 3-160846 7/1991

(Continued)

OTHER PUBLICATIONS

EESR—Extended European Search Report of European Patent Application No. 14198026.8 mailed Jun. 9, 2015.

*Primary Examiner* — Sun Lin
(74) *Attorney, Agent, or Firm* — Fujitsu Patent Center

(57) ABSTRACT

A mobile electronic device includes a first charging terminal that is to be brought into contact with a second charging terminal of a battery charger, a battery that is charged by electric power that is supplied from an external power supply via the first charging terminal, a resistor that is arranged between the first charging terminal and the battery, and a processor that measures voltage values of both ends of the resistor, that calculates, on the basis of the voltage values of the both ends, a terminal voltage value of the second charging terminal, and a resistance value of the resistor, an electric power consumption value of a contact portion in which the first charging terminal is brought into contact with the second charging terminal, and that stops charging the battery when the electric power consumption value is equal to or greater than a threshold.

4 Claims, 5 Drawing Sheets

(56) References Cited

U.S. PATENT DOCUMENTS

| | | | | |
|---|---|---|---|---|
| 7,741,812 B2 * | 6/2010 | Ukon | ............... | G01R 19/16542 |
| | | | | 320/132 |
| 8,299,758 B2 * | 10/2012 | Sakaue | ................ | H02J 7/0021 |
| | | | | 320/134 |
| 2010/0013442 A1 | 1/2010 | Yamazaki et al. | | |

FOREIGN PATENT DOCUMENTS

| | | |
|---|---|---|
| JP | 10-327536 | 12/1998 |
| JP | 2004-194481 | 7/2004 |

* cited by examiner

MOBILE ELECTRONIC DEVICE AND CHARGE CONTROL METHOD

CROSS-REFERENCE TO RELATED APPLICATION

This application is based upon and claims the benefit of priority of the prior Japanese Patent Application No. 2014-006132, filed on Jan. 16, 2014, the entire contents of which are incorporated herein by reference.

FIELD

The embodiments discussed herein are related to a mobile electronic device and a charge control method.

BACKGROUND

Mobile electronic devices, such as smart phones, tablet devices, or the like, includes charge connectors that are used to charge batteries, via external power supplies, included in the mobile electronic devices. A charging terminal of a charge connector is brought into contact with a charging terminal of a battery charger, thereby a battery is charged. An example of the battery charger includes a cradle that includes a charging terminal. A mobile electronic device is placed on a cradle that is connected to an external power supply and both charging terminals are brought into contact with each other, thereby the battery is charged.

Related-art examples are described, for example, in Japanese Laid-open Patent Publication No. 2004-194481 and Japanese Laid-open Patent Publication No. 10-327536.

For example, if a charging terminal is dirty or if a mobile electronic device is diagonally placed on a cradle and both charging terminals are brought into contact at a position that is shifted from a normal contact position, the resistance at the contact point in which the charging terminal of the battery charger is brought into contact with the charging terminal of the charge connector becomes large. Hereinafter, the resistance at the contact point in which the charging terminal of the battery charger is brought into contact with the charging terminal of the charge connector may sometimes be referred to as the "contact resistance". If charging is performed in such a state in which the contact resistance is large, the electric power consumed at the contact portion becomes large and thus heat is generated from the charging terminal. In recent years, with an increase in the capacity of a battery mounted on a mobile electronic device, in order to reduce the charging time, charging is performed by using high electric current. If the charging is performed by using high electric current when the contact resistance is large, an amount of heat generated in the charging terminal becomes great, which is dangerous. For example, if the amount of heat generated in the charging terminal becomes great, a casing of the mobile electronic device may sometimes be melted.

SUMMARY

According to an aspect of an embodiment, a mobile electronic device includes a first charging terminal that is to be brought into contact with a second charging terminal of a battery charger, a battery that is charged by electric power that is supplied from an external power supply via the first charging terminal, a resistor that is arranged between the first charging terminal and the battery, and a processor that measures voltage values of both ends of the resistor, that calculates, on the basis of the voltage values of the both ends, a terminal voltage value of the second charging terminal, and a resistance value of the resistor, an electric power consumption value of a contact portion in which the first charging terminal is brought into contact with the second charging terminal, and that stops charging the battery when the electric power consumption value is equal to or greater than a threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
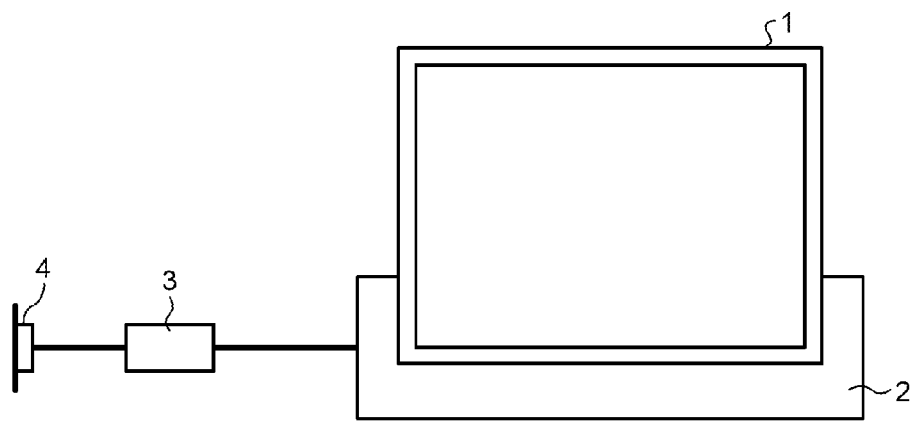
FIG. 1 is a schematic diagram illustrating an example of a charge state of a mobile electronic device according to a first embodiment.

Preferred Embodiments of the Present Invention will be explained with reference to accompanying drawings. The mobile electronic device and the charge control method disclosed in the present invention are not limited to these embodiments. Furthermore, in the embodiments described below, components that have the same function and steps at each of which the same process is performed are assigned the same reference numerals; therefore, descriptions of overlapped portions will be omitted.

[a] First Embodiment

Charge State of the Mobile Electronic Device

Figure 2:
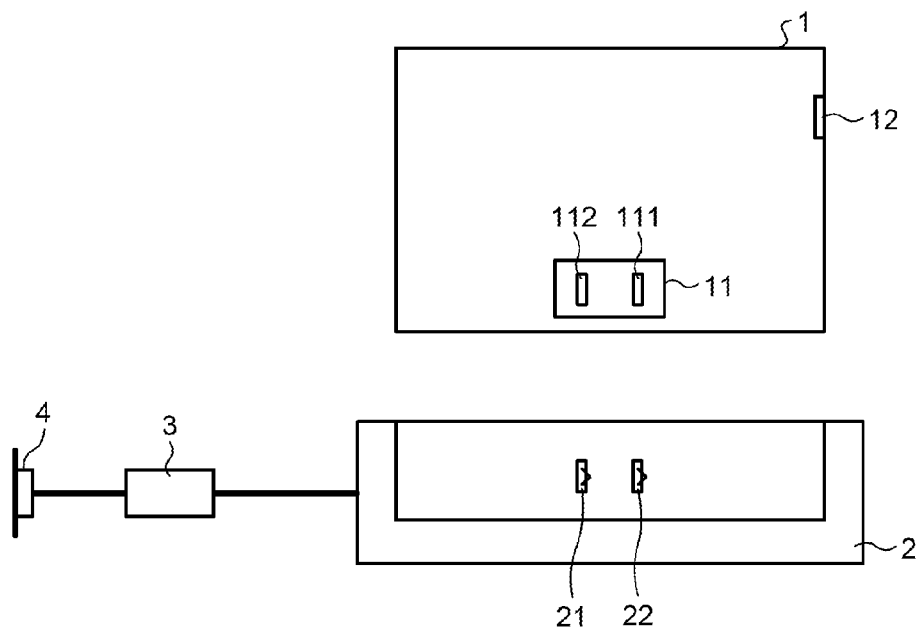
FIG. 2 is a schematic diagram illustrating an example of a charge state of the mobile electronic device according to the first embodiment.
Figure 3:
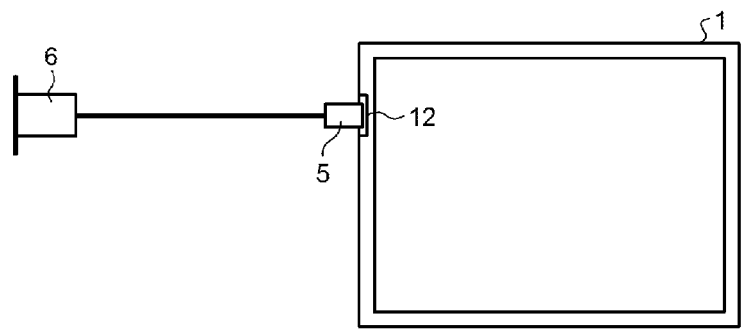
FIG. 3 is a schematic diagram illustrating an example of a charge state of the mobile electronic device according to the first embodiment.

FIGS. 1, 2, and 3 are schematic diagrams each illustrating an example of a charge state of a mobile electronic device according to a first embodiment. FIGS. 1 and 2 each illustrates a case in which charging is performed by using a cradle and FIG. 3 illustrates a case in which charging is performed by using a connector that conforms to the universal serial bus (USB) standard (hereinafter, sometimes referred to as a "USB connector"). Namely, in the case illustrated in each of FIGS. 1 and 2, a cradle 2 is a battery charger and, in a case illustrated in FIG. 3, a USB plug 5 is a battery charger.

FIG. 1 illustrates a mobile electronic device 1 viewed from the front surface, i.e., viewed from the surface of a touch panel. FIG. 2 illustrates the mobile electronic device 1 viewed from the back surface thereof. As illustrated in FIG. 1, the mobile electronic device 1 is charged in a state in which the mobile electronic device 1 is placed on a cradle 2 that is connected to a commercial power supply, which is an external power supply, via an AC adapter 3 and a plug socket 4. Namely, as illustrated in FIG. 2, the cradle 2 includes charging terminals 21 and 22. One of the charging terminals 21 and 22 is a grounded GND terminal. In contrast, the mobile electronic device 1 includes a charge connector that includes charging terminals 111 and 112 (hereinafter, sometimes referred to as a "cradle connector") 11. One of the charging terminals 111 and 112 is a grounded GND terminal. The mobile electronic device 1 is placed on the cradle 2 and the charging terminals 21 and 22 are brought into contact with the charging terminals 111 and 112, respectively, thereby the mobile electronic device 1 is charged via the external power supply.

Furthermore, as illustrated in FIG. 3, the mobile electronic device 1 includes a USB connector 12. The USB plug 5 that is connected to the commercial power supply, i.e., an external power supply, is connected to the USB connector 12 via an AC adapter 6 that is integrated with a plug socket, thereby the mobile electronic device 1 is charged.

For example, the AC adapters 3 and 6 decrease the alternating current commercial power supply supplied at 100 V to the direct current power supply at 5 V.

Hardware Configuration of the Mobile Electronic Device

Figure 4:
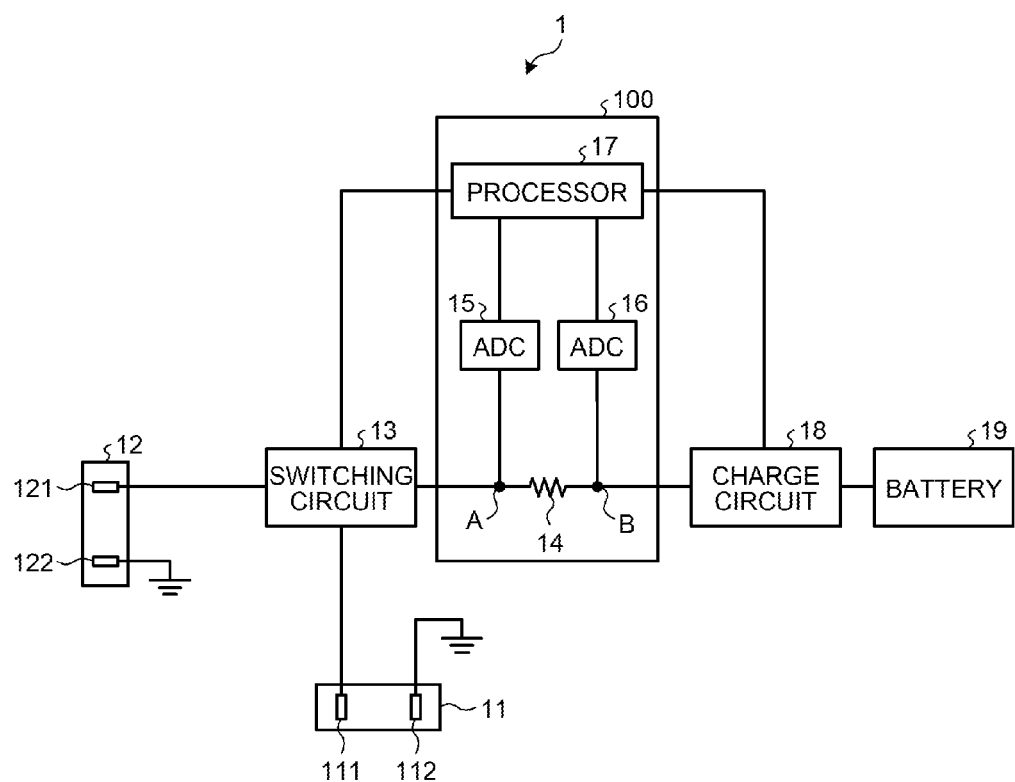
FIG. 4 is a schematic diagram illustrating an example of the hardware configuration of the mobile electronic device according to the first embodiment.

FIG. 4 is a schematic diagram illustrating an example of the hardware configuration of the mobile electronic device according to the first embodiment. The mobile electronic device 1 illustrated in FIG. 1 is, for example, a smart phone, a tablet device, or the like. In FIG. 1, the mobile electronic device 1 includes a cradle connector 11, the USB connector 12, a switching circuit 13, a charge control circuit 100, a charge circuit 18, and a battery 19.

The cradle connector 11 includes the charging terminals 111 and 112. The charging terminal 111 is connected to the switching circuit 13 and the charging terminal 112 is grounded. Namely, the charging terminal 112 is a GND terminal. Furthermore, the charging terminal 111 is to be brought into contact with the charging terminal 21 in the cradle 2 and the charging terminal 112 is to be brought into contact with the charging terminal 22 that is a GND terminal of the cradle 2.

The USB connector 12 includes charging terminals 121 and 122. The charging terminal 121 is connected to the switching circuit 13 and the charging terminal 122 is grounded. Namely, the charging terminal 122 is a GND terminal. Furthermore, the charging terminal 121 is to be brought into contact with the charging terminal of the USB plug 5 and the charging terminal 122 is to be brought into contact with a GND terminal of the USB plug 5.

The switching circuit 13 is connected to the charge control circuit 100 and switches a path for supplying an external power supply between a supply path passing through the cradle connector 11 and a supply path passing through the USB connector 12. If the switching circuit 13 determines that the cradle 2 is connected to the cradle connector 11, the switching circuit 13 connects the electric current path between the charging terminal 111 and a resistor 14 and disconnects the electric current path between the charging terminal 121 and the resistor 14. In contrast, if the switching circuit 13 determines that the USB plug 5 is connected to the USB connector 12, the switching circuit 13 disconnects the electric current path between the charging terminal 111 and the resistor 14 and connects the electric current path between the charging terminal 121 and the resistor 14.

At this point, if the voltage value of the charging terminal 111 is equal to or greater than a first threshold, the switching circuit 13 determines that the cradle 2 is connected to the cradle connector 11. Furthermore, if the voltage value of the charging terminal 121 is equal to or greater than a second threshold, the switching circuit 13 determines that the USB plug 5 is connected to the USB connector 12. Namely, if the voltage value of the charging terminal 111 becomes equal to or greater than the first threshold or the voltage value of the charging terminal 121 becomes equal to or greater than the second threshold, the switching circuit 13 determines that the external power supply is connected to the mobile electronic device 1. Furthermore, if the switching circuit 13 determines that the external power supply is connected to the mobile electronic device 1, the switching circuit 13 outputs a notification to a processor 17 indicating that connection to the external power supply from the mobile electronic device 1 has been detected (hereinafter, sometimes referred to as an "external power supply connection detection notification"). In general, the first threshold is greater than the second threshold.

Furthermore, if the voltage value of the charging terminal 111 becomes equal to or greater than the first threshold and then becomes less than the first threshold or if the voltage value of the charging terminal 121 becomes equal to or greater than the second threshold and then becomes less than the second threshold, the switching circuit 13 determines that the external power supply is removed from the mobile electronic device 1. If the switching circuit 13 determines that the external power supply is removed from the mobile electronic device 1, the switching circuit 13 outputs a notification to the processor 17 indicating that a removal of the external power supply from the mobile electronic device 1 has been detected (hereinafter, sometimes referred to as an "external power supply removal detection notification").

The charge control circuit 100 includes the resistor 14, analog-to-digital converters (ADCs), i.e., analog-digital conversion circuits, 15 and 16, and the processor 17.

The voltage generated at an input end A of the resistor 14 is input to the ADC 15. The ADC 15 detects an analog voltage value of the input end A of the resistor 14, converts the detected analog voltage value to a digital voltage value, and then outputs the converted value to the processor 17. Hereinafter, the voltage value of the input end A of the resistor 14 is represented by "$V_A$". The voltage value $V_A$ corresponds to the voltage value of the charging terminal 111.

The voltage generated at an output end B of the resistor 14 is input to the ADC 16. The ADC 16 detects an analog voltage value of the output end B of the resistor 14, converts the detected analog voltage value to a digital voltage value, and then outputs the converted value to the processor 17. Hereinafter, the voltage value of the output end B of the resistor 14 is represented by "$V_B$". The voltage value $V_B$ corresponds to the voltage value of the voltage that is input to the battery 19.

The input end A of the resistor 14 is connected to the charging terminal 111 of the cradle connector 11 or connected to the charging terminal 121 of the USB connector 12 via the switching circuit 13. Furthermore, the output end B of the resistor 14 is connected to the battery 19 via the charge circuit 18. Namely, the resistor 14 is arranged between the charging terminal 111 and the battery 19. Furthermore, the resistor 14 is arranged between the charging terminal 121 and the battery 19.

When, as a trigger, the cradle 2 is connected to the cradle connector 11 or when, as a trigger, the USB plug 5 is connected to the USB connector 12, the processor 17 controls the charging of the battery 19 by controlling the charge circuit 18. Namely, the processor 17 starts the charge control when an external power supply connection detection notification is input from the switching circuit 13. The charge control will be described in detail later. An example of the processor 17 includes a central processing unit (CPU), a digital signal processor (DSP), a field programmable gate array (FPGA), or the like.

The charge circuit 18 charges the battery 19 with the electric power that is supplied from an external power supply via the charging terminal 111 or the charging terminal 121. Namely, the battery 19 is charged with the electric power that is supplied from the external power supply via the charging terminal 111 or the charging terminal 121.

Operation of the Mobile Electronic Device

In the following, a description will be given of a case, as an example, in which charging is performed by using the cradle 2. In a description below, the output voltage value of the AC adapter 3, i.e., the voltage value of the charging terminal 21 of the cradle 2, is represented by "$V_1$". Furthermore, the value of the electric current flowing from the charging terminal 21 of the cradle 2 to the charging terminal 111 of the cradle connector 11 when the external power supply is connected, i.e., the value of the electric current flowing in the resistor 14, is represented by "I". Furthermore, the value of the contact resistance between the charging terminal 21 and the charging terminal 111 or between the charging terminal 22 and the charging terminal 112 is represented by "$R_1$" and the resistance value of the resistor 14 is represented by "$R_2$". Furthermore, as described above, the voltage value of the input end A of the resistor 14 is represented by "$V_A$" and the voltage value of the output end B of the resistor 14 is represented by "$V_B$".

The voltage value $V_1$ can be represented by Equation (1) below by using the electric current value I, the contact resistance value $R_1$, and the voltage value $V_A$. Furthermore, the electric current value I can be represented by Equation (2) below by using the voltage values $V_A$ and $V_B$ and by using the resistance value $R_2$.

$$V_1 = I \cdot R_1 + V_A \quad (1)$$

$$I = (V_A - V_B)/R_2 \quad (2)$$

From Equation (1) and Equation (2), the contact resistance value $R_1$ can be represented by Equation (3) below:

$$R_1 = ((V_1 - V_A) \cdot R_2)/(V_A - V_B) \quad (3)$$

Furthermore, if the electric power consumption value of the contact portion between the charging terminal 21 and the charging terminal 111 is represented by "P", the electric power consumption value P can be represented by Equation (4) below:

$$P = I^2 \cdot R_1 \quad (4)$$

By substituting Equations (2) and (3) above in Equation (4) above, the electric power consumption value P can be represented by Equation (5) below:

$$P = ((V_A - V_B) \cdot (V_1 - V_A))/R_2 \quad (5)$$

Figure 5:
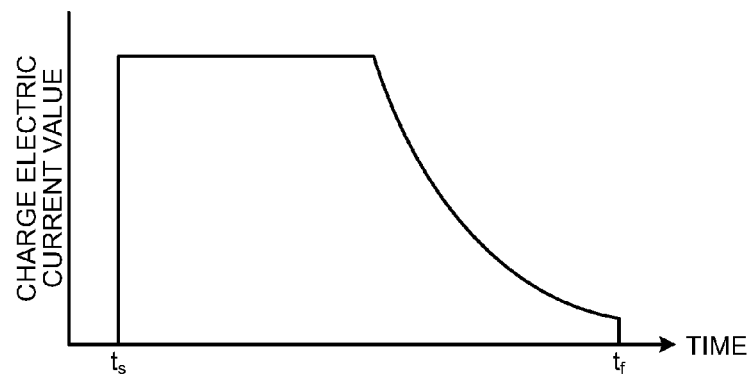
FIG. 5 is a schematic diagram illustrating an example of a state in which a change in a charge electric current according to the first embodiment.

At this point, as illustrated in FIG. 5, the value of the charge electric current, i.e., the value of the input current that is input to the battery 19, is increased to a predetermined value at a time point $t_s$ at which the external power supply is connected to the mobile electronic device 1, is maintained at a constant value, and is gradually decreased in accordance with the amount of the charging of the battery 19. Then, the charge electric current becomes zero at a time point $t_f$ at which the battery 19 is fully charged. FIG. 5 is a schematic diagram illustrating an example of a state in which a change in a charge electric current according to the first embodiment. In this way, the charge electric current may sometimes vary during the time period from when the charging is started until when the charging is ended. Furthermore, because the electric power consumption value P of the contact portion where the charging terminal 21 is brought into contact with the charging terminal 111 can be represented by Equation (4) above, the electric power consumption value P also varies in accordance with the change in the charge electric current. Furthermore, as the electric power consumption value P becomes greater, an amount of heat generated at the contact portion in which the charging terminal 21 is brought into contact with the charging terminal 111 becomes large.

Accordingly, in the first embodiment, as described below, voltage values $V_A$ and $V_B$ of both ends of the resistor 14 are measured; an electric power consumption value P is calculated in accordance with Equation (5) above, the charging of the battery 19 is stopped when the electric power consumption value P becomes equal to or greater than the threshold.

Figure 6:
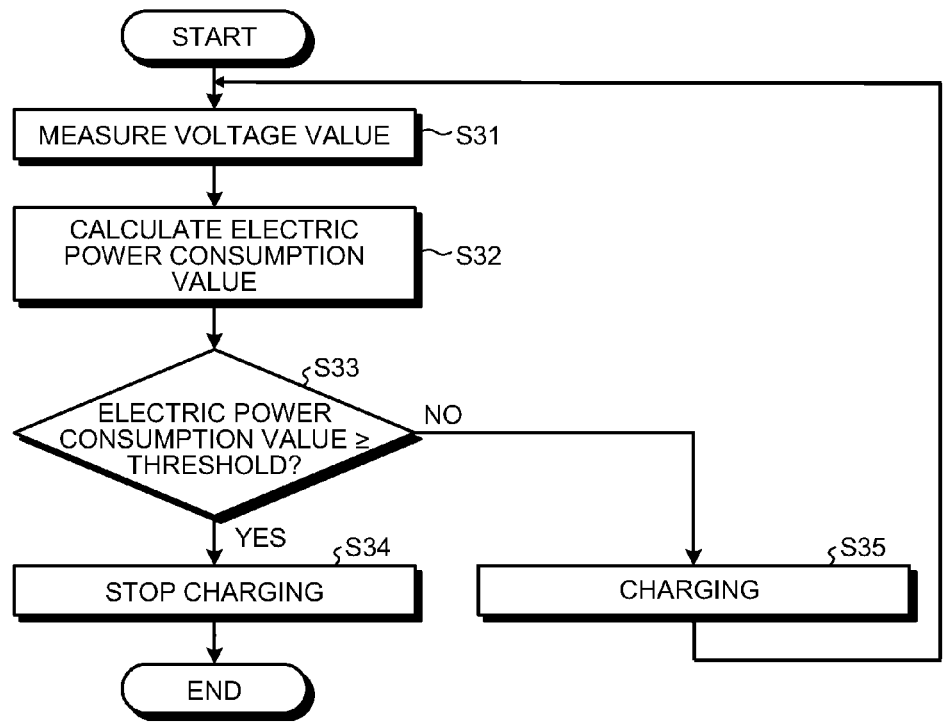
FIG. 6 is a flowchart illustrating the flow of an operation of the mobile electronic device according to the first embodiment.

FIG. 6 is a flowchart illustrating the flow of an operation of the mobile electronic device according to the first embodiment. The flow of the process indicated by the flowchart illustrated in FIG. 6 is periodically repeated during the time period from when the external power supply is connected to the mobile electronic device 1 until when the external power supply is removed from the mobile electronic device 1. Namely, the operation is periodically performed in accordance with the process indicated by the flowchart illustrated in FIG. 6 during the time period from when an external power supply connection detection notification is input to the processor 17 until when an external power supply removal detection notification is input to the processor 17.

First, the processor 17 measures the voltage value $V_A$ that is input from the ADC 15 and measures the voltage value $V_B$ that is input from the ADC 16 (Step S31).

Then, in accordance with Equation (5) above, the processor 17 calculates the electric power consumption value P (Step S32). Namely, on the basis of the voltage values $V_A$ and $V_B$ of both ends of the resistor 14, the voltage value $V_1$ of the charging terminal 21 of the cradle 2, and the resistance value $R_2$ of the resistor 14, the processor 17 calculates the electric power consumption value P of the contact portion in which the charging terminal 21 is brought into contact with the charging terminal 111. At this point, the resistance value $R_2$ of the resistor 14 is already known to the processor 17. Furthermore, the voltage value $V_1$ of the charging terminal 21 of the cradle 2, i.e., the output voltage value $V_1$ of the AC adapter 3, is constant and is already known to the processor 17.

Then, the processor 17 determines whether the electric power consumption value P is equal to or greater than the threshold (Step S33).

If the electric power consumption value P is equal to or greater than the threshold (Yes at Step S33), the processor 17 determines that the amount of heat generated at the charging terminals 21 and 111 becomes equal to or greater than the threshold and thus stops charging the battery 19 (Step S34). For example, by stopping the operation of the charge circuit 18, the processor 17 stops charging the battery 19. Furthermore, for example, by controlling an electric current such that an output current from the charge circuit 18, i.e., an input current to the battery 19, is 0 A, the processor 17 stops charging the battery 19. Furthermore, for example, by disconnecting the switch arranged in the charge circuit 18 on the electric current path for the battery 19 and blocking the input current, the processor 17 stops charging the battery 19. Because the charging of the battery 19 is stopped, the flow of the electric current between the charging terminal 21 of the cradle 2 and the charging terminal 111 of the cradle connector 11 is stopped. Consequently, heat generated at the charging terminals 21 and 111 is suppressed.

In contrast, if the electric power consumption value P is less than the threshold (No at Step S33), the processor 17 determines that the amount of heat generated at the charging terminals 21 and 111 becomes less than the threshold, the processor 17 continues to charge the battery 19 (Step S35).

As described above, in the first embodiment, the mobile electronic device 1 includes the charging terminal 111 of the cradle connector 11, the battery 19, the resistor 14, and the processor 17. The charging terminal 111 of the cradle connector 11 is to be brought into contact with the charging terminal 21 of the cradle 2. The battery 19 is charged by the electric power that is supplied from the external power supply via the charging terminal 111. The resistor 14 is arranged between the charging terminal 111 and the battery 19. The processor 17 measures the voltage values $V_A$ and $V_B$ of both ends of the resistor 14. Furthermore, on the basis of the voltage values $V_A$ and $V_B$ of both ends of the resistor 14, the voltage value $V_1$ of the charging terminal 21 of the cradle 2, and the resistance value $R_2$ of the resistor 14, the processor 17 calculates the electric power consumption value P of the contact portion in which the charging terminal 21 is brought into contact with the charging terminal 111. Then, when the electric power consumption value P of the contact portion in which the charging terminal 21 is brought into contact with the charging terminal 111 is equal to or greater than the threshold, the processor 17 stops charging the battery 19.

By doing so, because the electric power consumption value P of the contact portion in which the charging terminal 21 is brought into contact with the charging terminal 111 becomes great, the electric current flowing from the charging terminal 21 to the charging terminal 111 can be stopped when the amount of heat generated in the charging terminals 21 and 111 becomes great. Consequently, according to the first embodiment, heat generated in the charging terminals 21 and 111 can be suppressed.

[b] Second Embodiment

A second embodiment differs from the first embodiment in that the output voltage value $V_1$ of the AC adapter 3 varies. Namely, the output voltage value of the AC adapter 3 may sometimes shift by $\pm \Delta V$ from the designed output voltage value due to a manufacturing error. For example, if the designed output voltage value is 5 V, the actual output voltage value may sometimes vary for each AC adapter in the range of 4.8 V to 5.2 V. In this way, if the output voltage value $V_1$ of the AC adapter 3, i.e., the voltage value $V_1$ of the charging terminal 21 of the cradle 2, varies, the accuracy of the electric power consumption value P that is calculated in accordance with Equation (5) above and that is calculated under the condition that $V_1$ is constant is decreased. Accordingly, in the second embodiment, the output voltage value $V_1$ of the AC adapter 3, i.e., the voltage value $V_1$ of the charging terminal 21 of the cradle 2, is measured as follows.

The configuration of the mobile electronic device according to the second embodiment is the same as that in the first embodiment (FIG. 4); therefore, a description will be given with reference to FIG. 4. Furthermore, in the following, for the operation of the mobile electronic device according to the second embodiment, differences from the first embodiment will be described below with reference to FIG. 7.

Operation of the Mobile Electronic Device

Figure 7:
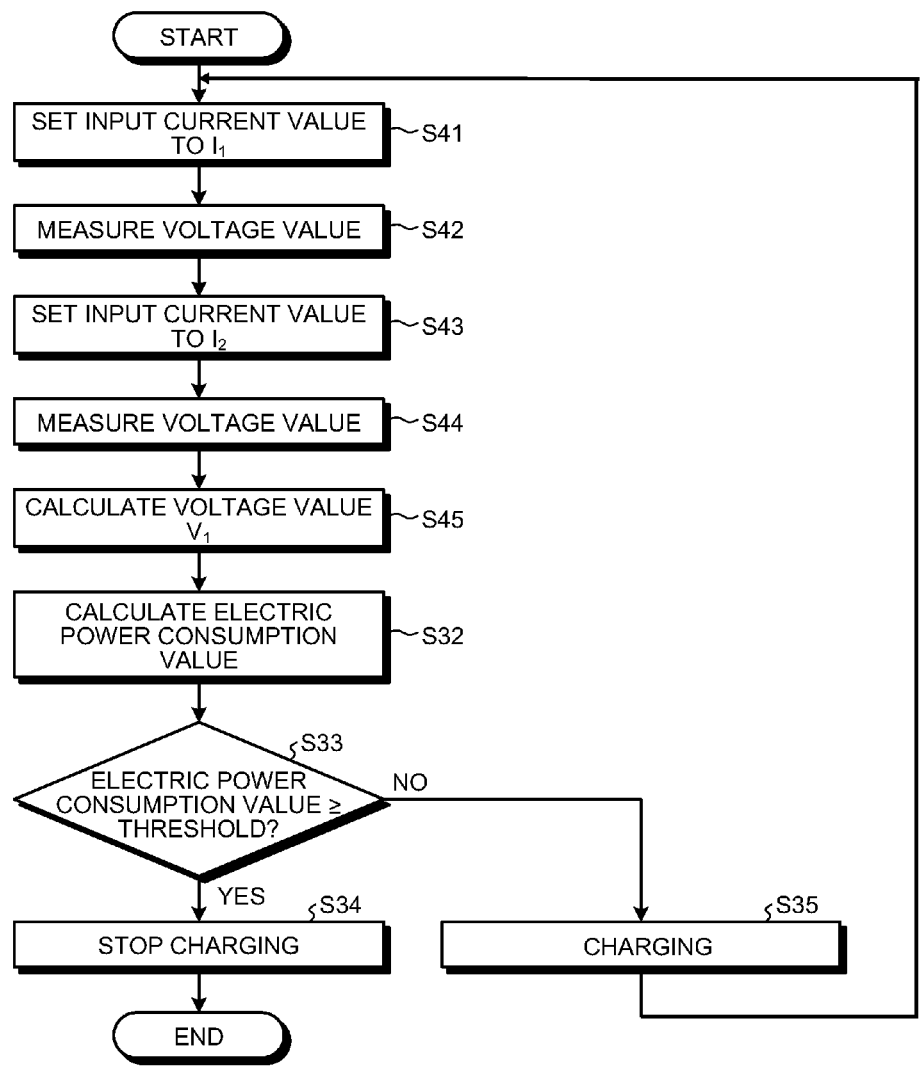
FIG. 7 is a flowchart illustrating the flow of an operation of a mobile electronic device according to a second embodiment.

FIG. 7 is a flowchart illustrating the flow of an operation of a mobile electronic device according to a second embodiment. Similarly to the first embodiment, the flow of the process indicated by the flowchart illustrated in FIG. 7 is periodically repeated during the time period from when the external power supply is connected to the mobile electronic device 1 until when the external power supply is removed from the mobile electronic device 1. In the following, a description will be given by dividing the description into operation example 1 and operation example 2.

Operation Example 1

First, the processor 17 controls the charge circuit 18 and sets the value of the input current that is input to the charge circuit 18 to "$I_1$" (Step S41). The input current value $I_1$ corresponds to the electric current value I in Equation (1) above, i.e., the value of the electric current flowing to the resistor 14.

Then, the processor 17 measures the voltage value that is input from the ADC 15 when the input current value is set to $I_1$, i.e., the voltage value $V_{A1}$ of the input end of the resistor 14 obtained when the input current value is set to $I_1$ (Step S42). The voltage value $V_{A1}$ corresponds to the voltage value $V_A$ in Equation (1) above.

Consequently, the processor 17 can obtain Equation (6) below:

$$V_1 = I_1 \cdot R_1 + V_{A1} \quad (6)$$

Then, the processor 17 controls the charge circuit 18 and sets the value of the input current that is input to the charge circuit 18 to "$I_2$" (Step S43). Here, the value of $I_2$ is different from the value of $I_1$. Furthermore, the input current value $I_2$ corresponds to the electric current value I in Equation (1) above, i.e., the electric current flowing in the resistor 14.

Then, the processor 17 measures the voltage value that is input from the ADC 15 when the input current value is set to $I_2$, i.e., the voltage value $V_{A2}$ of the input end of the resistor 14 obtained when the input current value is set to $I_2$ (Step S44). The voltage value $V_{A2}$ corresponds to the voltage value $V_A$ in Equation (1) above.

Consequently, the processor 17 can obtain Equation (7) below:

$$V_1 = I_2 \cdot R_1 + V_{A2} \quad (7)$$

From Equations (6) and (7), the voltage value $V_1$ can be represented by Equation (8) below:

$$V_1 = (V_{A1} \cdot I_2 - V_{A2} \cdot I_1)/(I_2 - I_1) \quad (8)$$

Accordingly, in accordance with Equation (8) above, the processor 17 calculates the output voltage value $V_1$ of the AC adapter 3, i.e., the voltage value $V_1$ of the charging terminal 21 of the cradle 2 (Step S45).

The processes subsequently performed at Steps S32, S33, S34, and S35 are the same as those performed in the first embodiment.

In this way, in operation example 1, the processor 17 sets the electric current flowing in the resistor 14 to the electric current value $I_1$ and the electric current value $I_2$. Furthermore, the processor 17 measures the electric current value that is associated with the electric current value $I_1$ and that is the electric current value $V_{A1}$ of the input end of the resistor 14 and measures the electric current value that is associated with the electric current value $I_2$ and that is the electric current value $V_{A2}$ of the input end of the resistor 14. Then, on the basis of the electric current value $I_1$, the electric current value $I_2$, the voltage value $V_{A1}$ associated with the electric current value $I_1$, and the voltage value $V_{A2}$ associated with the electric current value $I_2$, the processor 17 calculates the voltage value V.

Operation Example 2

The voltage value $V_A$ in Equation (1) above can be represented by Equation (9) below:

$$V_A = I \cdot R_2 + V_B \quad (9)$$

Consequently, Equation (1) above can be transformed to Equation (10) below:

$$V_1 = I \cdot R_1 + I \cdot R_2 + V_B \quad (10)$$

Accordingly, first, the processor 17 controls the charge circuit 18 and sets the value of the input current that is input to the charge circuit 18 to "$I_1$" (Step S41). The input current value $I_1$ corresponds to the electric current value I in Equation (10) above, i.e., the value of the electric current flowing in the resistor 14.

Then, the processor 17 measures the voltage value that is input from the ADC 16 when the input current value is set to $I_1$, i.e., the voltage value $V_{B1}$ of the output end of the resistor 14 obtained when the input current value is set to $I_1$ (Step S42). The voltage value $V_{B1}$ corresponds to the voltage value $V_B$ in Equation (10) above.

Consequently, the processor 17 can obtain Equation (11) below:

$$V_1 = I_1 \cdot R_1 + I_1 \cdot R_2 + V_{B1} \quad (11)$$

Then, the processor 17 controls the charge circuit 18 and sets the value of the input current that is input to the charge circuit 18 to "$I_2$" (Step S43). The value of $I_2$ is different from the value of $I_1$.
Furthermore, the input current value $I_2$ corresponds to the electric current value I in Equation (10) above, i.e., the value of the electric current flowing in the resistor 14.

Then, the processor 17 measures the voltage value that is input from the ADC 16 when the input current value is set to $I_2$, i.e., the voltage value $V_{B2}$ of the output end of the resistor 14 obtained when the input current value is set to $I_2$ (Step S44). The voltage value $V_{B2}$ corresponds to the voltage value $V_B$ in Equation (10) above.

Consequently, the processor 17 can obtain Equation (12) below:

$$V_1 = I_2 \cdot R_1 + I_2 \cdot R_2 + V_{B2} \quad (12)$$

From Equations (11) and (12), the voltage value $V_1$ can be represented by Equation (13) below:

$$V_1 = (V_{B1} \cdot I_2 - V_{B2} \cdot I_1)/(I_2 - I_1) \quad (13)$$

Accordingly, in accordance with Equation (13) above, the processor 17 calculates output voltage value $V_1$ of the AC adapter 3, i.e., the voltage value $V_1$ of the charging terminal 21 of the cradle 2 (Step S45).

The processes subsequently performed at Steps S32, S33, S34, and S35 are the same as those performed in the first embodiment.

In this way, in operation example 2, the processor 17 sets the electric current flowing in the resistor 14 to the electric current value $I_1$ and the electric current value $I_2$. Furthermore, the processor 17 measures the electric current value that is associated with the electric current value $I_1$ and that is the electric current value $V_{B1}$ of the output end of the resistor 14 and measures the electric current value that is associated with the electric current value $I_2$ and that is the electric current value $V_{B2}$ of the output end of the resistor 14. Then, on the basis of the electric current value $I_1$, the electric current value $I_2$, the voltage value $V_{B1}$ associated with the electric current value $I_1$, and the voltage value $V_{B2}$ of the electric current value $I_2$, the processor 17 calculates the voltage value $V_1$.

As described above, by calculating the voltage value $V_1$ by using the process indicated in operation example 1 or operation example 2, the voltage value $V_1$ can be accurately calculated even if the output voltage value $V_1$ of the AC adapter 3, i.e., the voltage value $V_1$ of the charging terminal 21 of the cradle 2, varies. Consequently, according to the second embodiment, it is possible to prevent a decrease in the accuracy of the calculation of the electric power consumption value P due to a variation in the voltage value $V_1$.

Figure 8:
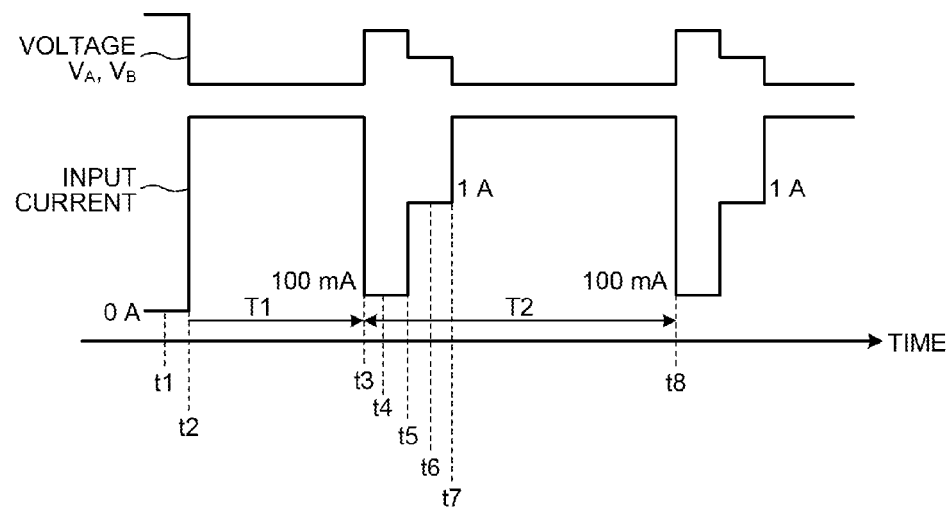
FIG. 8 is a timing chart illustrating the operation of the mobile electronic device according to the second embodiment.

In the following, the above operation of the mobile electronic device 1 will be described by using a timing chart. FIG. 8 is a timing chart illustrating the operation of the mobile electronic device according to the second embodiment. FIG. 8 illustrates an example in which $I_1$ described above is set to 100 mA and $I_2$ described above is set to 1 A.

At time t1, the mobile electronic device 1 is connected to the cradle 2 and, at time t2, the processor 17 sets the input current value to the charge circuit 18 to a predetermined value that is greater than 1 A and then the charging of the battery 19 is started.

At time t3 at which predetermined time T1 has elapsed since time t2, the processor 17 sets the value of the input current that is input to the charge circuit 18 to 100 mA. Then, at time t4, the processor 17 measures the voltage value $V_{A1}$ or $V_{B1}$ that is associated with 100 mA.

Then, at time t5, the processor 17 sets the value of the input current that is input to the charge circuit 18 to 1 A. Subsequently, at time t6, the processor 17 measures the voltage value $V_{A2}$ or $V_{B2}$ that is associated with 1 A. Furthermore, at time t6, after the processor 17 calculates the voltage value $V_1$, the processor 17 calculates the electric power consumption value P and determines whether the charging of the battery 19 is to be stopped on the basis of the comparison result between the electric power consumption value P and the threshold.

Then, at time t7, the processor 17 sets the input current value that is input to the charge circuit 18 to the same predetermined value that is set at time t2.

Then, at time t8 at which predetermined time T2 has elapsed since time t3, the processor 17 again sets the value of the input current that is input to the charge circuit 18 to 100 mA. Subsequently, at a fixed cycle of the predetermined time T2, the processes that are performed at time t3 to t7 are repeatedly performed.

[c] Third Embodiment

A third embodiment differs from the first embodiment in that the electric power consumption value P is calculated with the assumption that the electric current value I described above does not vary and is constant. In the following, a description will be given of differences from the first embodiment.

Figure 9:
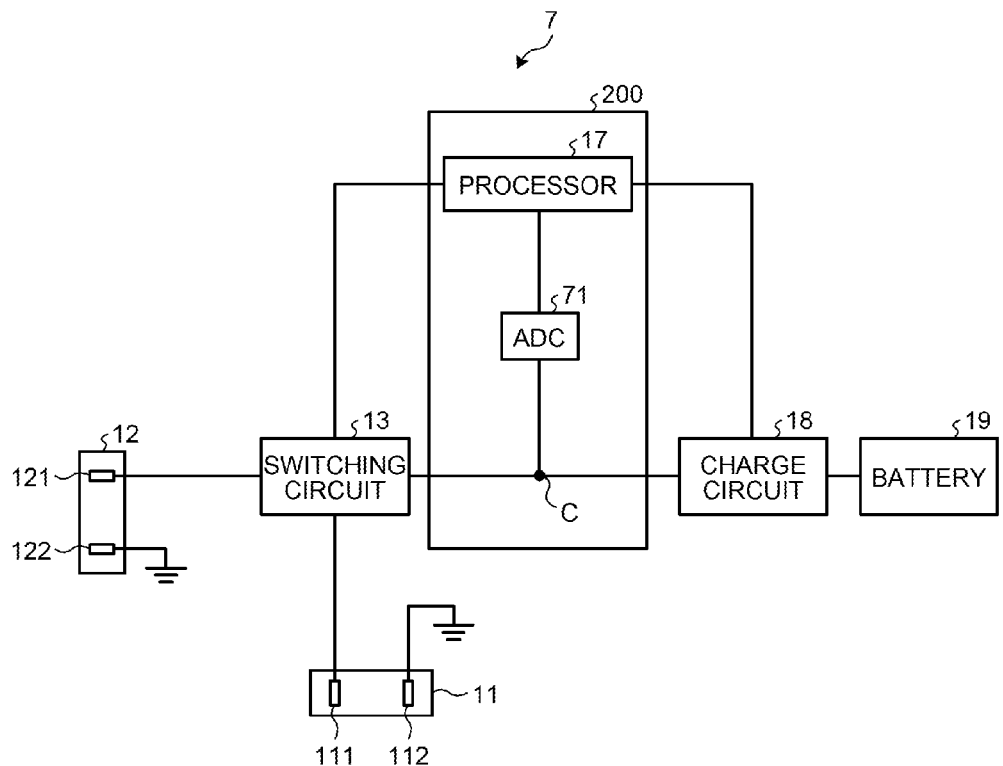
FIG. 9 is a schematic diagram illustrating an example of the hardware configuration of a mobile electronic device according to a third embodiment.

FIG. 9 is a schematic diagram illustrating an example of the hardware configuration of a mobile electronic device according to a third embodiment. In FIG. 9, the mobile electronic device 7 includes a charge control circuit 200. The charge control circuit 200 includes an ADC 71 and the processor 17.

The voltage at a point C is input to the ADC 71. The ADC 71 detects the analog voltage value of the point C, converts the detected analog voltage value to a digital voltage value, and then outputs the detected value to the processor 17. Hereinafter, the voltage value of the point C is represented by "$V_C$". The voltage value $V_C$ corresponds to the voltage value of the charging terminal 111.

Here, the electric power consumption value P can be represented by Equation (14) below by using the electric current value I, the voltage value $V_1$, and the voltage value $V_C$.

Equation (14)

$$P=(V_1-V_C) \cdot I \qquad (14)$$

Here, it is assumed that the electric current value I and the voltage value $V_1$ are constant and are known to the processor 17. Accordingly, on the basis of the measured voltage value $V_C$, the processor 17 calculates the electric power consumption value P in accordance with Equation (14).

In this way, in the third embodiment, the processor 17 calculates the electric power consumption value P with the assumption that the electric current value I does not vary and is constant. By doing so, the configuration of the charge control circuit 200 can be more simplified compared with the configuration of the charge control circuit 100 according to the first embodiment.

[d] Another Embodiment

[1] The processes performed by the processor 17 may also be implemented by allowing the processor 17 to execute a program associated with each of the processes. For example, the program associated with each of the processes performed by the processor 17 described above may be executed by being stored in a memory (not illustrated) each included in the mobile electronic devices 1 and 7 and by being read by the processor 17 from the memory.

[2] For the operation described above, a description has been given, as an example, of a case in which the charging is performed via the cradle connector 11. However, similarly to a case in which the charging is performed via the cradle connector 11, the technology disclosed in the present invention may also be implemented when the charging is performed via the USB connector 12.

[3] The processor 17 may also resume the charging when, after the charging is stopped because the electric power consumption value P becomes equal to or greater than the threshold, the electric power consumption value P becomes less than the threshold because of a decrease in the charge electric current value I or the contact resistance value $R_1$.

According to an aspect of an embodiment of the present invention, an advantage is provided in that heat generated in a charging terminal can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile electronic device comprising:
a first charging terminal that is to be brought into contact with a second charging terminal of a battery charger;
a battery that is to be charged by electric power supplied from an external power supply via the first charging terminal;
a resistor that is arranged between the first charging terminal and a charge circuit prior to the battery; and
a processor that measures voltage values of both ends of the resistor, calculates, based on a given resistance value and the measured voltage values of the resistor, a terminal voltage value of the second charging terminal, and an electric power consumption value of a contact portion in which the first charging terminal is brought into contact with the second charging terminal, and stops charging the battery when the electric power consumption value is equal to or greater than a predetermined threshold value.

2. The mobile electronic device according to claim 1, wherein the processor sets an electric current flowing in the resistor to a first electric current value and a second electric current value that is different from the first electric current value, measures a first voltage value associated with the first electric current value and a second voltage value associated with the second electric current value at an input end of the resistor, and calculates the terminal voltage value based on the first electric current value, the second electric current value, the first voltage value, and the second voltage value.

3. The mobile electronic device according to claim 1, wherein the processor sets an electric current flowing in the resistor to a first electric current value and a second electric current value that is different from the first electric current value, measures a first voltage value associated with the first electric current value and a second voltage value associated with the second electric current value at an output end of the resistor, and calculates the terminal voltage value based on the first electric current value, the second electric current value, the first voltage value, and the second voltage value.

4. A computer-implemented charge control method for charging a battery included in a mobile electronic device, wherein the mobile electronic device has a first charging terminal to be brought into contact with a second charging terminal of a battery charger, and the battery is to be charged by electric power supplied from an external power supply via the first charging terminal, the charge control method comprising:
measuring, by a processor, voltage values of both ends of a resistor arranged between the first charging terminal and a charge circuit prior to the battery;
calculating, by the processor and based on a given resistance value and the measured voltage values of the resistor, a terminal voltage value of the second charging terminal, and an electric power consumption value of a contact portion in which the first charging terminal is brought into contact with the second charging terminal; and stopping charging the battery activated by the processor, when the electric power consumption value is equal to or greater than a predetermined threshold value.

\* \* \* \* \*